US009553839B2

(12) United States Patent
Syri et al.

(10) Patent No.: US 9,553,839 B2
(45) Date of Patent: Jan. 24, 2017

(54) METHOD AND ARRANGEMENT FOR OBTAINING AN ELECTRONIC MAIL SERVICE (71) Applicant: Nokia Technologies Oy, Espoo (FI)

(72) Inventors: Juha Syri, Helsinki (FI); Heikki Hyotyniemi, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/853,514

(22) Filed: Sep. 14, 2015

(65) Prior Publication Data
US 2016/0006681 A1 Jan. 7, 2016

Related U.S. Application Data (63) Continuation of application No. 10/522,050, filed as application No. PCT/FI2002/000645 on Jul. 22, 2005, now Pat. No. 9,135,236.

(51) Int. Cl.
*H04M 1/725* (2006.01)
*H04L 12/58* (2006.01)
(Continued)

(52) U.S. Cl.
CPC ............. *H04L 51/26* (2013.01); *G06F 17/277* (2013.01); *G06F 17/2715* (2013.01);
(Continued)

(58) Field of Classification Search
CPC ........... H04L 51/22; H04L 51/32; H04W 4/12; H04W 4/18; H04W 4/06; H04W 4/206
See application file for complete search history.

(56) References Cited

U.S. PATENT DOCUMENTS 6,147,977 A 11/2000 Thro et al.
6,363,140 B1 3/2002 Pinard
(Continued)

FOREIGN PATENT DOCUMENTS

EP 1160704 A2 12/2001
EP 1227408 A2 7/2002
(Continued)

OTHER PUBLICATIONS

Payne et al., Interface Agents that Learn: An Investigation of Learning Issue in a Mail Agent Interface, Dept. of Computer Science, University of Aberdeen, Oct. 26, 1995, pp. 1-29.
(Continued)

*Primary Examiner* — Khalid Shaheed
(74) *Attorney, Agent, or Firm* — Ditthavong & Steiner, P.C.

(57) ABSTRACT

The a user interface (UI) residing in a mobile environment, which has a possibility of indicating after reading each message whether or not the message is divergent from the normal/general level as to the importance of the message. Advantageously, the user does not need to do the indication every time when reading the mail. In the interface, after a given mail has been read (or a part of the given mail has been read), there occurs a possibility to choose between two alternatives: interesting or non-interesting. Advantageously, there is not required other extra work from the user. Gradually, a mail agent collects information about what kind of mail the user prefers and does not prefer. The result will be a prearranged list by preference in the incoming mail. Any mail similar to the ones previously indicated as important will appear first to the user. The applied algorithm in the methods and systems is based on statistical analysis of the linguistic contents of the mail.

26 Claims, 4 Drawing Sheets (51) Int. Cl.
  *G06F 17/27* (2006.01)
  *G06Q 10/10* (2012.01)
  *H04L 29/08* (2006.01)
(52) U.S. Cl.
  CPC ....... *G06Q 10/107* (2013.01); *H04L 12/5855* (2013.01); *H04L 51/14* (2013.01); *H04L 51/38* (2013.01); *H04L 67/306* (2013.01); *H04L 12/5895* (2013.01)

(56) References Cited

U.S. PATENT DOCUMENTS

| | | | |
|---|---|---|---|
| 6,606,373 | B1 | 8/2003 | Martin |
| 6,714,967 | B1 | 3/2004 | Horvitz |
| 6,834,196 | B1 | 12/2004 | Tarnanen et al. |
| 7,337,181 | B2 * | 2/2008 | Horvitz ............. G06F 17/30707 |
| 7,359,936 | B2 | 4/2008 | Gruen et al. |
| 7,454,457 | B1 * | 11/2008 | Lowery .................. H04L 47/10 709/201 |
| 2001/0037407 | A1 | 11/2001 | Dragulev et al. |
| 2002/0035501 | A1 | 3/2002 | Handel et al. |
| 2002/0076024 | A1 | 6/2002 | Brennan |
| 2002/0120600 | A1 | 8/2002 | Schiavone et al. |
| 2003/0020749 | A1 | 1/2003 | Abu-Hakima et al. |
| 2004/0172457 | A1 | 9/2004 | Horvitz |
| 2006/0245388 | A1 | 11/2006 | Jeon |

FOREIGN PATENT DOCUMENTS

| | | |
|---|---|---|
| WO | 99/65256 | 12/1999 |
| WO | 0169432 A2 | 9/2001 |
| WO | 02/056225 A1 | 7/2002 |

OTHER PUBLICATIONS

Office Action for corresponding European Application No. 07 117 391.8-2413, dated Nov. 4, 2011, pp. 1-5.
European Search Report for corresponding European Application No. 07 117 391.8-2413, dated Mar. 28, 2008, 2 pages.

* cited by examiner

METHOD AND ARRANGEMENT FOR OBTAINING AN ELECTRONIC MAIL SERVICE

RELATED APPLICATION

This patent document is a continuation of U.S. patent application Ser. No. 10/522,050, filed on Aug. 3, 2006, entitled "METHOD AND ARRANGEMENT FOR OBTAINING AN ELECTRONIC MAIL SERVICE" which is incorporated herein by reference in its entirety.

TECHNICAL FIELD OF THE INVENTION

The present invention relates generally to providing electronic mail services, and more particularly, to methods and arrangements for presenting electronic mail with a preference in a mobile station.

BACKGROUND OF THE INVENTION

Electronic mail (e-mail) is a popular way to communicate with others. Electronic mail systems operate to send messages over a network. The network can include internal networks and external (e.g., public) networks. An example of an internal network is a local area network (LAN), and an example of an external network is the Internet. Typically, the electronic mail systems are LAN wide systems that reside on an internal network but also permit coupling with an external network so that messages can be exchanged with other electronic mail systems.

Recently, Internet-based electronic mail systems have been developed and implemented to provide electronic mail services over the Internet. In such systems, there may not be internal network because the electronic mail system resides on the Internet. The electronic mail system has a mail server that interacts with users' network browsers so that users are able to request electronic mail services which are performed by the mail server. Typically, the mail server is a Hyper Text Transfer Protocol (HTTP) server.

The electronic mail systems have been implemented over wired networks as well as over wireless networks. The availability of the network determines whether a client application (e.g., network browser) is in communication with the mail server. The client application operates on a local machine, whereas the mail server operates on a remote machine. In the case of wired networks, the local machine is, for example, a desktop computer. In the case of wireless networks, the local machine is a mobile device. For example, the mobile device can be a mobile telephone, a personal digital assistant (PDA) or a portable computer that has wireless local area network access to the mail server.

Because of the dependency of the operation of client applications on the bandwidth of networks, client applications often have to wait for resources from mail servers. These wait times are unacceptably long when the network is loaded. Even when the network is not congested, the client applications conventionally require substantial amounts of network bandwidth to provide the e-mail services and this tends to burden the network and induce wait times faced by users.

A cache memory may be helpful in reducing the dependency of the computers or mobile devices on network bandwidth. However, the cache memory is only helpful when the newly requested resource happens to reside in the cache memory. Still further, the cache memory is limited and cannot serve as a storage to store all the resources likely to be again requested. Moreover, mobile devices (particularly hand-held mobile devices) need to keep cache memories relatively small due to power, cost and space limitations.

Mobile devices when used as a mail terminal have further problems. An interface limitation poses significant difficulties to mobile electronic mail technology. A size of the screen of the mobile device is tiny and very limited. Mobile device's screen can only show a limited amount of information, for example 5 rows each row with 10 characters. The screen supports scarce amount of graphics. Typically, the screen can only present simple pixel graphics. Moreover, the limited bandwidth of the mobile communication poses difficulties to mobile e-mail services. For example, conventional mobile communication systems provide text messages of limited length, and result in truncation. Concatenation of messages yields back to the problem of limited size. Even the most sophisticated mobile communication system can only provide data transfer rate which is about few hundred kbits/s, and the future mobile communication systems promise about a couple hundred kbit/s more data transfer speed. Yet, e-mail messages may constitute as large as megabyte files entirely. Thus, the limited number of messages that can be shown without too great a time lag and effort cause problems when gaining mail via a mobile device. In addition, the problems limit the mushrooming of the e-mail services. For example, a rather common solution has been avoiding using the mobile device for mail purposes, or using it when other mediums have not been available.

In view of various inherent limitations of mobile devices, it would be desirable to avoid these and other problems associated with prior art systems. Thus, there is a need for techniques to provide smooth facing with information by a user seeking to utilize electronic mail service provided by a mail server across a network.

SUMMARY OF THE INVENTION

Now a method and a system has been invented where a user of a mobile device smoothly faces electronic mail service provided by a mail server across a network.

In accordance with a first aspect of the invention there is provided a method for obtaining an electronic mail service to a mobile station, the method comprising the steps of:
  receiving an electronic mail message at the mobile station,
  indicating the electronic mail message by a level as to a preference of the electronic mail message for a user of the mobile station,
  transferring data information indicating the preference to a computing system operating a mail agent,
  processing data information indicating the preference for resulting in an order of preference for electronic mail messages for the user.

In accordance with a second aspect of the invention there is provided a method for providing an electronic mail service for a mobile station, the method comprising the steps of:
  receiving an electronic mail message at a computing system operating a mail agent,
  processing the electronic mail message for resulting in an order of preference for electronic mail messages for a user of the mobile station, and
  transferring a list indicating the order of preference for the electronic mail messages for the user to the mobile station.

Advantageously, the mobile communication system is less burdened while applying the priorization because the preference list data can be smaller than data of the e-mails itself. Also, the limitation aspects of the mobile station is considered because in the list the most significant/interesting e-mail messages appear first, and they fit the screen of the mobile station better than the mere list of inbox messages. Moreover, the user's effort to give the preference information is conveniently applied along with reading the actual e-mails, and this may take place with or without the mobile station. It is quite convenient to enter the preferences also while using the computer for reading the e-mail, and in such a way the mail agent obtains the preference information. Moreover, no e-mail is automatically deleted, and this option is left for user's consideration.

In accordance with a third aspect of the invention there is provided a system for obtaining an electronic mail service for a mobile station, the system comprising:
- a mobile station for receiving an electronic mail message and for indicating the electronic mail message by a level as to a preference of the electronic mail message for a user of the mobile station,
- a network for transferring data information indicating the preference to a computing system operating a mail agent, and
- the computing system operating the mail agent for processing the data information indicating the preference for resulting in an order of preference for electronic mail messages for the user.

In accordance with a fourth aspect of the invention there is provided a system for providing an electronic mail service for a mobile station, the system comprising:
- a computing system operating a mail agent for receiving an electronic mail message, and for processing the electronic mail message for resulting in an order of preference for electronic mail messages for a user of the mobile station, and
- a network for transferring a list indicating the order of preference for the electronic mail messages for the user to the mobile station.

In accordance with a fifth aspect of the invention there is provided a mobile station for providing a user an electronic mail service, the mobile station comprising:
- an output for presenting an electronic mail message at the mobile station,
- means for indicating the electronic mail message by a level as to a preference of the electronic mail message for a user of the mobile station,
- means for transferring data information indicating the preference to a computing system operating a mail agent, wherein the mail agent is for processing data information indicating the preference for resulting in an order of preference for electronic mail messages for the user.

In accordance with a sixth aspect of the invention there is provided a computer program product comprising a program of instructions executable by a computing system for processing an electronic mail service to a mobile station, the computer program product comprising:
- computer program code for causing the system to receive an electronic mail message at the mobile station,
- computer program code for causing the system to receive an indication for the electronic mail message by a level as to a preference of the electronic mail message for a user of the mobile station,
- computer program code for causing the system to transfer data information indicating the preference to a computing system operating a mail agent, and computer program code for causing the system to process the data information indicating the preference for resulting in an order of preference for electronic mail messages for the user.

In accordance with a seventh aspect of the invention there is provided a computer program product comprising a program of instructions executable by a computing system for providing an electronic mail service to a mobile station, the computer program product comprising:
- computer program code for causing the system to receive an electronic mail message at a computing system operating a mail agent,
- computer program product for causing the system to process the electronic mail message for resulting in an order of preference for electronic mail messages for a user of the mobile station, and
- computer program product for causing the system to transfer a list indicating the order of preference for the electronic mail messages for the user to the mobile station.

For better understanding of the present invention reference is made to the following description, taken in conjunction with the accompanying drawings, and its scope will be pointed out in the appending claims.

BRIEF DESCRIPTION OF THE DRAWINGS

The invention will now be described, by way of example only, with reference to the accompanying drawings, in which.

DETAILED DESCRIPTION OF THE EMBODIMENTS

The preferred embodiments of the invention provide a user interface (UI), which has a possibility of indicating after reading each message whether or not the message is divergent from the normal/general level as to the importance of the message. Advantageously, the user does not need to do the indication every time when reading the mail. In the interface, after a given mail has been read (or a part of the given mail has been read), there occurs a possibility to choose between two alternatives: interesting or non-interesting. Advantageously, there is not required other extra work from the user. Gradually, a mail agent collects information about what kind of mail the user prefers and does not prefer. The result will be a prearranged list by preference in the incoming mail. Any mail similar to the ones previously indicated as important will appear first to the user. The applied algorithm in the methods and systems is based on statistical analysis of the linguistic contents of the mail.

The user gains personal control on the kind of material he/she wants to receive when space- or time-related limitations prevent the receipt of the total contents, for example, in the mobile environment. A user control is an important issue in mail handling, this being a personal and a private service in nature. The user can also control the pace of adaptability him/herself. Therefore, it is possible to get mild or hardly significant personification if only on few occasions mail importance can be compared. Also, a more radical personification is possible when the important and unimportant messages are stable, for example, always being from the same senders or about the same issues. By this linear approach, in which all the mail is presented in a list, in which only the order indicates the likely importance, another important usability issue is taken into consideration. One's personal mail being delicate material, no mail is automatically disposed, only given a lower priority. The user's effort for prioritization of the e-mail messages is reduced/very small in the preferred embodiments.

Some embodiments of the invention apply mobile station. The mobile stations can take a variety of forms. Examples of mobile stations include mobile computing devices, cellular or mobile phones, portable computer devices, personal digital assistant (PDA) devices. Most mobile stations are also wireless devices. Wireless devices are computing or communication devices that communicate in a wireless manner with a network. Preferably, the mobile station is Short Message Service (SMS) compliant operating in Global System for Mobile communication (GSM) for transmitting and receiving the SMS indicating the list of e-mails and/or at least a part of the e-mail. However, other user messages for conveying message between a network and the mobile station are, for example, USSD (Unstructured Supplementary Services Data). The USSD provides the operator with a tool to design proprietary supplementary services. As with the SMS, USSD uses a signaling channel as a bearer. However, instead of having the store-and-forward functionality, it is session-oriented. This means that when the user accesses a USSD service, a session is established and the radio connection stays open until the user, application, or time-out releases it. Response times for interactive applications are faster. A packet switched data transfer contains the evolvement of the SMS and the USSD into the GPRS and further into the UMTS. These sophisticated wireless communication networks provide the ability to transfers the message in form of packets via the wireless communication network. Also instead of the SMS, R-data offers also a way to transfer the message in IS-136 (Time Division Multiple Access, TDMA) network to an element of the wireless communication network to be forwarded to the e-mail server. The mobile station can be a hand-held device which the user can conveniently carry or care. Some mobile stations are tiny whereas some mobile stations provide the user with more services.

Figure 1A:
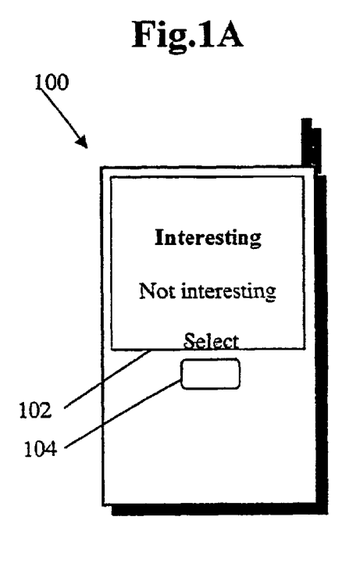
FIG. 1A shows an exemplary embodiment of a user interface for entering preferences for certain electronic mail messages.

Some embodiments of the invention apply the user interface (UI). FIG. 1A shows an exemplary embodiment of a user interface for entering preferences for certain electronic mail messages. A mobile station 100 comprises the UI containing a display 102 and a selection key 104. The display 102 shows the list of e-mail messages, the e-mail message or a part of the list or the e-mail message to the user. A simple choice option is given after reading each message. A menu of two options is shown to the user. The menu shows two options: interesting and non-interesting. The options depict the preference the user can set for each e-mail message. Thus, the e-mail message can be set either as interesting having a relevance to the user or non-interesting having no particular relevance to the user. By the selection button 104 the user can indicate the options on the screen 102 of the mobile station 100. Advantageously, an existing selection button in a conventional cellular mobile phone can be applied.

Figure 1B:
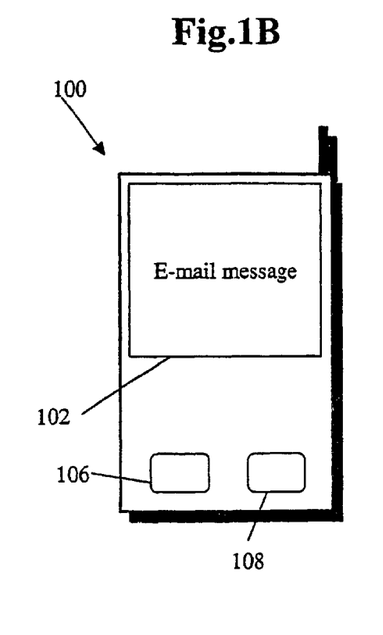
FIG. 1B shows another embodiment of a user interface for entering preferences for certain electronic mail messages.

FIG. 1B shows another embodiment of the user interface (UI) for entering preferences for certain electronic mail messages. In the example of FIG. 1B, the mobile station 100 contains two selection keys (106 and 108). The selection key 106 indicates the option interesting or relevant e-mail message, and the selection key 108 indicates the option non-interesting or not particularly relevant e-mail message. The keys (106 and 108) can be certain keys of the keypad of the conventional cellular mobile phone, for example, key "1" represents the selection key 106 and key "3" represents the selection key 108.

Some embodiments of the invention apply the mobile communication. Preferably, the invention will be described in connection with the GSM (Global System for Mobile Communication). Regarding the invention, the operation and structure of the mobile communication system are not relevant, and hence they are described only to a degree that may assist in comprehending the transmission of the e-mail messages. Other applicable mobile communication systems in transmitting the messages are GPRS (General Packet Radio Services) and 3G (Third generation for Mobile Communication). Short Message Service (SMS) provides an applicable example of a transmit of the short message from the mobile station via GSM to the e-mail server.

Figure 2:
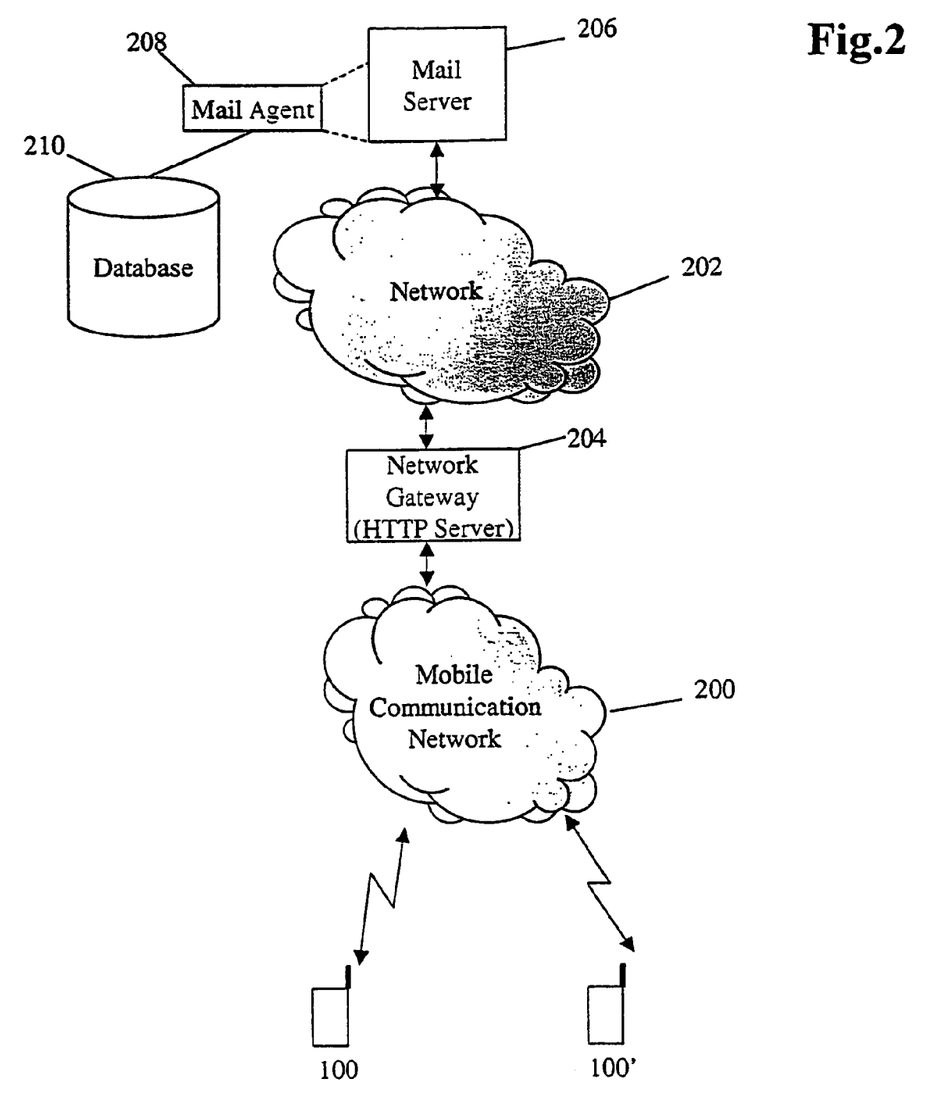
FIG. 2 depicts an embodiment of a networking environment in which the principles of the present invention are applied.

FIG. 2 has been described in the foregoing. In the following, corresponding reference signs have been applied to corresponding parts. Users have mobile stations (100 and 100'). There may be several mobile terminals and users, but for illustrative purposes two is shown in the exemplary FIG. 2. The mobile stations (100 and 100') may be capable of presenting data information such as text, voice, audio, and multimedia. The mobile stations (100 and 100') may be coupled with or be under coverage of at least one mobile network 200. The mobile network 200 may be any type of mobile communication network, including, but not restricted to, GSM (Global System for Mobile communication), GPRS (General Packet Radio System), UMTS (Universal Mobile Telephone System) or 3G (Third generation of mobile communications), where 3G can be compatible with GSM, HSCSD (High Speed Circuit Switched Data), GPRS, EDGE (Enhanced Data Rates for Global/GSM Evolution) and WCDMA (Wideband Code Division Multiple Access). Various other mobile networks can also be supported, such as CDMA (Code Division Multiple Access), PDC (Personal Digital Communications), CDMA2000. The mobile stations (100 and 100') are couple with a network gateway 204 through the mobile network 200. The network gateway 204 can also be referred to as a proxy server or mobile data server. The network gateway 204 is able to exchange information with a mail server 206. The network gateway 204 and the mail server 206 are interconnected through a network 202. The mail server 206 manages the storage and delivery of electronic mail messages to the appropriate location (e.g., the mobile stations 100 and 100'). The mail server 206 is receivable for being addressed in the e-mail message delivery via the network 202. Typically, the network 202 is a wired network. As an example, the network 202 can be a local area network (LAN), a wired area network (WAN), the Internet, or some combination thereof. In one embodiment, the network 202 is the Internet and the network gateway 204 and the mail server 206 are HTTP servers.

Still referring to the example of FIG. 2, a mail agent 208 resides in the mail server 206. The mail agent 208 constitutes a software application for performing the management and control of the ordered preference of e-mail messages for the user. Preferably, the mail agent 208 is stored on the mail server 208. Some examples of the operations of the mail agent 208 application are disclosed later. The mail agent 208 stores the user preference information for each e-mail message to a database 210. The preference information is gradually collected to the database 210. The database is also stored in the mail server 206. The database 208 may or may not be used for the storage for the actual e-mail messages controlled by the mail server 206. Alternatively, the mail agent 208 and possibly the database 210 can be stored in the network gateway 204. In this embodiment, the preference list is constructed at the network gateway 208, and the e-mail messages are communicated between the mail server 206 and the mail agent 208 via the network 202. Moreover in the alternative embodiment, the user's indicated preference information for each e-mail message is processed at the network gateway 208, and the reference information is gradually collected to the database 210.

Figure 3:
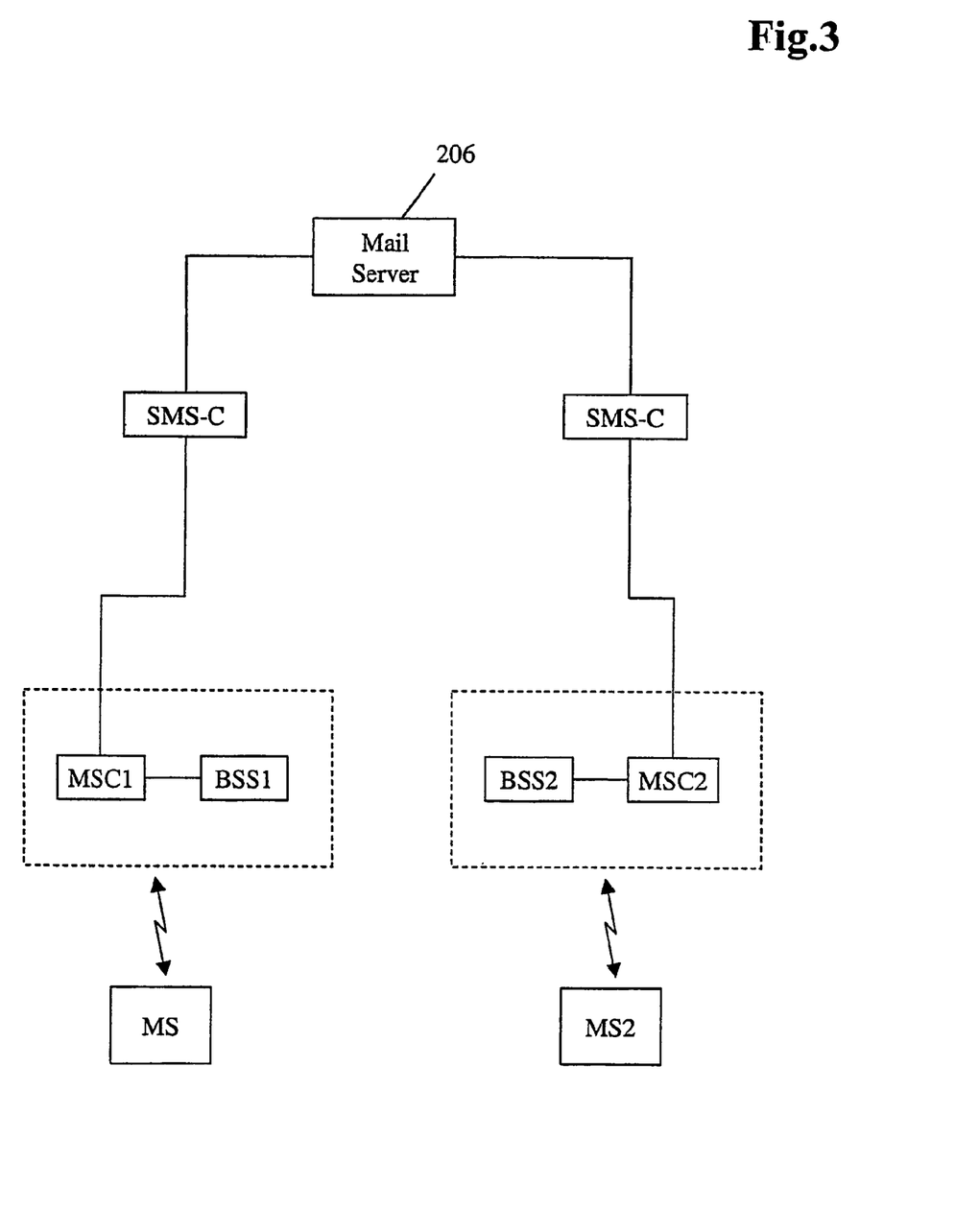
FIG. 3 depicts a further embodiment of a networking system for smoothly obtaining electronic mail services to a mobile station.

FIG. 3 has been described in the foregoing. In the following, corresponding reference signs have been applied to corresponding parts. In the example of FIG. 3 the invention is applied in the GSM. Referring to FIG. 3, a mobile switching centre (MSC1 or MSC2) switches incoming and outgoing calls in the network. It also performs tasks typical of mobile telephone traffic, such as subscriber location management, in co-operation with mobile network subscriber registers a Visitor Location Register VLR and a Home Location Register (HLR). The HLR is a subscriber's home register for a permanent storage of subscriber data. The VLR is a local register to which the subscriber data is copied from the HLR when a mobile subscriber visits the area of the VLR. The Mobile Station (MS, the MS in the example can be the referred mobile station 100) communicates with the MSC via base station systems (BSS1 & BSS2). The BSS includes a base station controller (BSC) (not shown) and base stations (BTS) (not shown), for example, fixed radio transceivers by which the MS communicates with a MSC over the radio path.

Referring to the example of FIG. 3, the short message service (SMS) of the mobile communication network 200 offers means for transferring short messages with limited length (140 bytes) between the wireless terminal 100 and a short message service centre (SMSC). By means of concatenated SMS messages, more than 140 bytes can be transmitted. The MS originated short messages are transferred from the MS to the SMSC. The short messages can be destined for some MSs or for service providers in a fixed network such as in the Internet. A protocol employed between the SMSC and the MS is called SMTP (Short Message Transport Protocol).

Still referring to the example of FIG. 3, the SMSC is operationally coupled with the mobile communication network 200 via the MSC. The MSC relays short messages between the MS and the SMSC, and it performs the HLR (and VLR) inquiries possibly needed for the message in the communication. The SMSC is given a dedicated ISDN number in the number space of the mobile communication network, and the MS uses the ISDN number for addressing a short message to the SMSC. The short message also identifies the MS when the network originated data information is to be obtained.

Still referring to the exemplary FIG. 3, the SMSC is operatively coupled with the network 202 such that it can serve as a gateway between the mobile communication network 200 and the network 202. Thus, the MS is coupled with the mail server 206 via multiple network platforms.

Accordingly, an embodiment of the invention enables sending and delivery of the e-mail messages. A delivery means between the MS and the mail server 206 is by the SMS. As described below in detail, the ordered e-mail preference list is obtained by requesting the e-mails to the MS using the SMS messages. A large number of users, local networks and server computing systems may be connected and operated by the system. The system of the embodiment in FIG. 3 is very advantageous because it can be introduced into the existing short message service centres.

Some embodiments of the invention apply the mail agent. The mail agent operates behind the user interface (UI) in the system. The e-mail message contains typically many characters. The characters establish character strings or character patterns forming different words. These set of characters establish terms for the processing of the e-mails in the mail agent. The terms may also comprise a set of words. The terms, which have been extracted from the textual message body, each have their own entry locations in the high-dimensional data vectors. There can be so-called stop words for the terms for linguistic based email preference processing, or some terms may establish the stop words. Some too common stop words (for example, "and", "the", etc.), having no classification power, are automatically rejected from further analyses. The messages are presented using so-called "fingerprints": The term counts (weighted by a priori "interestingness" value for terms if delivered by the preprocessing) are calculated and the "message vectors" f comprises these term counts. In some technical implementation these vectors are typically sparsely coded for reducing the memory requirements. This relieves the calculation and processing.

Maintaining the dimension of the term space may become a problem if on-line adaptation of the preference model is necessary. More simpler embodiment, where the training of the preference model is carried out off-line, that is, the user selects sets of interesting and non-interesting messages once and for all out of a pool of candidate messages, and the model is tuned using these samples; during on-line operation the model is assumed to remain intact (until new adaptation is explicitly requested). In this embodiment, maintaining the term space is simple: No new terms are added after training, so that one can ignore all terms in the new messages that fall outside the term set of the training samples, keeping the "term dimension" constant (assume it is denoted n in what follows). On the other hand, if continuous on-line adaptation is needed, so that new words may constantly be introduced, more sophisticated term space maintenance is necessary to avoid overflows, and these issues are briefly explained in what follows.

A compromise for the sparsity and the selection of the important terms can be based on the following equation $$\Pi = \Gamma_n (f + \gamma \cdot \Pi).$$

In the example, $\Pi$ is the vector of frequencies for the terms that are the most frequent, for example, an incidence for commonly appearing words. If f contains a reference to a term that has not been detected before, the dimension of the vectors grows; the new entry in the frequency vector is initialized to zero. The list of terms corresponding to the vector entries needs to be simultaneously managed. The expression within the parenthesis $(f + \gamma \cdot \Pi)$ means that the words are slowly forgotten if they are not used in the latest messages. Generally $\gamma$ represents an adjustable parameter that affects adaptation properties. The $\gamma$ can also be applied as a "forgetting factor" in some further equations with possibly different value. Typically the following stands for the γ: 0<<γ<1. The function $\Gamma_\eta$ cuts off all entries that are not among the η most common words, that is, the corresponding entries in the vector are set to zero. The η is selected according to practical tests and defines the size of the user's preference model, determining the sizes of the vectors that are discussed later.

The fingerprint vector f is thereafter truncated by dropping all entries that are not among the most common important ones. In some approaches all messages to be used for training have equal relevance, the message/fingerprint vector f is normalized to a unit length; these operations can be expressed as $$f \leftarrow \Pi(f),$$

representing the deletion of the least frequent terms, and normalization being carried out by $$f \leftarrow \frac{f}{\sqrt{f^T f}}.$$

Some embodiments of the invention apply user profiles. In principle, user profile vectors have the similar structure and the vector elements have the same interpretations as the fingerprint vectors f have. Some user-specific extras can be added. For example, if the user wants a non-linear profile, so that combinations of various terms would be specially included in the model, this kind of entries could be manually added in the user profile without jeopardizing the functionality of the algorithms. This addition enables a filtering of the messages based on certain criteria. For example, it is possible to filter out messages with the words "Person X" and "meeting", without too much affecting other messages containing the word "meeting". A more experienced user can be also given an option that the numerical values within the user profile could be manually adjusted, without changing the profile structure. This all means that the basic linear functionality can be expanded without changing the framework; however, more sophisticated user interface with some tailoring tools should be provided.

As compared to some earlier embodiments, simpler embodiments are presented here; for example, it is assumed that the weighting of individual terms is reliably delivered by the preprocessing. The following formulas are presented for the embodiment of "off-line" training.

The user profile contains few data structures. First, the ordered set of terms being included in the analysis is stored; what is more, two real-valued vectors of length n are needed:
 the mean value vector $\bar{f}=E\{f\}$, denoting the average term count in all messages; adaptation of this vector is straightforward and is applicable by the skilled person.
 the "relevance direction" vector r, to be derived below.

Assume that the training set comprises k message samples, from f(1) to f(k), and for these samples we know the message relevancies, so that there exist values y(1) to y(k), where y(i) is 1 if the message i is important and −1 if it is non-important. Assume that these samples are collected in matrices, so that $$F = \begin{pmatrix} f^T(1) - \bar{f} \\ \vdots \\ f^T(k) - \bar{f} \end{pmatrix} \text{ and } Y = \begin{pmatrix} y(1) \\ \vdots \\ y(k) \end{pmatrix}.$$

Now the so called PLS (Partial Least Squares) regression (in an eigenproblem framework) is applied for finding a model for message relevance; the benefits here are that the noise sensitivity is low, and simultaneously the method takes the output efficiently into account (as contrasted against PC regression). The idea is first to solve the eigenproblem $$\frac{1}{k^2} \cdot F^T Y Y^T F \cdot \theta = \lambda \cdot \theta$$

for the only non-vanishing eigenvector θ (note that the rank of the matrix is 1); this eigenvector is then used as a latent basis where the data is first projected. The final mapping model between f and y is then given by $$\hat{y} = r \cdot (f - \bar{f}) = \frac{Y^T F \theta \theta^T}{\theta^T F^T F \theta} \cdot (f - \bar{f}).$$

This means that the estimate for the relevance for a fresh message f is given by the above expression.

Still referring to the example of the mail agent. As the user has made some efforts either on-line or off-line for indicating some email messages with a preference as to the substantial importance/interest of the email message for the user, the mail agent has gradually, or in some embodiments beforehand by the user profiles, collected information about what kind of emails user prefers for. As new email message appears for being delivered to the user via mobile environment, the mail agent checks the linguistic content of the email message. Thus, the mail agent compares the content to the user's preference information. The mail agent extracts some predetermined character sets from the email message, for example words, and runs the character set through the mail agent algorithm processes as described above. As for the result, the mail agent finds out whether the email may establish any importance/interest for the user. Accordingly, the mail agent sets some preference values for the email based on the importance/interest value. Accordingly, as the amount of the email messages with the relevancy information increases in the inbox, the preference list showing the most relevant email messages first is being established in the mail agent.

Figure 4:
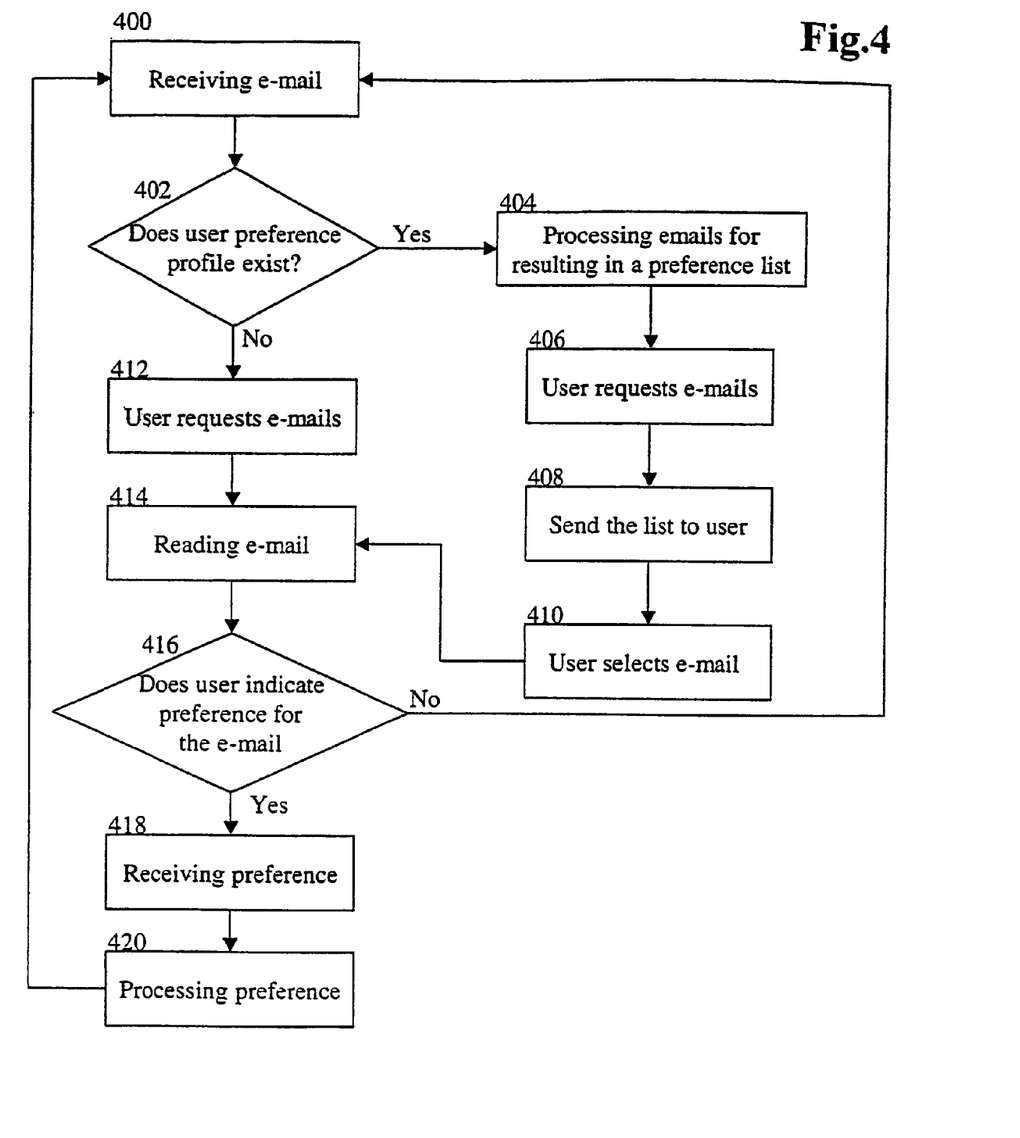
FIG. 4 depicts in a form of a flow chart a method for obtaining a personified electronic mail service to a mobile station in accordance with an embodiment of the invention.

FIG. 4 has been described in the foregoing. In the following, corresponding reference signs have been applied to corresponding parts. FIG. 4 depicts in a form of a flow chart a method for obtaining a personified electronic mail service to a mobile station in accordance with an embodiment of the invention. In step 400, there is received the e-mail message. The e-mail message can be received by the mail server 206. The mail server 206 may apply the mail agent 208 application for processing the received e-mail message. In condition 402, there is checked whether there exists a previous user preference profile. The existing user preference profile shows to the system what kind of e-mail messages the user prefers for. Also the system may check whether or not the e-mail message is divergent from the normal or general level as to the importance of the e-mail message. If the previous user preference information exists, the user's e-mail messages are processed for resulting in a preference list (step 404). The preference list shows a prearranged list by preference in the incoming mail. Any e-mail that is similar to the ones previously indicated by the user as to the importance for the user will appear first in the list. In step 406, the user requests e-mail message(s). The user of the mobile station 100 can make an initiation for obtaining his e-mail messages. For example, the user writes a command or presses a key for obtaining e-mails. The mobile station 100 transmits the request to the mail server 206 via the networks. In step 408, the list is sent to the user. The mail server 206 obtains the list from the mail agent and send the list to the mobile station 100 via the networks. Advantageously, the data amount of the list is applicable for the mobile environment. The user of the mobile Station reads the list. The list is very conveniently visible to the user because the most preferred e-mail messages for the user are substantially shown first. Moreover, the substantially important e-mail messages substantially fit to a view of the screen 102, or can be scrolled such that the more efforts for scrolling is required the less important the e-mail messages for the user are. In step 410, the user selects a certain e-mail message from the list. The user indicates the certain e-mail message and the mobile station 100 receives the indication and transmits a request for obtaining the certain e-mail message to the mail server 206. If the user preference does not exists yet, and the user requests e-mail in step 412, the mobile station receive either information that the preference list does not exists or the inbox. The step 412 is similar to the step 406. The mobile station 100 receives the e-mail message preferably contained in the SMS message(s). The list is preferably also contained in the SMS message(s). If the list or the e-mail does not fit into the SMS message several messages can be applied. The user reads the e-mail message in step 414. Content of the e-mail message at least partially fits to the screen 102. In condition 416, there is being checked whether user indicates a preference(s) for the e-mail message. After reading the e-mail message, or during or even before reading the e-mail message, the user can indicate the preference for each e-mail message. FIGS. 1A and 1B disclose examples of the entering of the preference. Alternatively, the user can give his opinion on the importance and the possible other preference information by using, for example, a computer. Advantageously, the mail server 206 and the mail agent 208 can be accessed by a desktop computer also, and the preference application for processing and storing the preference information can serve various different client devices. For example, the user enters his preference information by the computer and thereafter accesses his e-mails by the mobile station 100 and obtains the preference list of his e-mails to the mobile station 100. The user can indicate that the e-mail message is divergent from the normal/general level as to the importance of the message. The user can indicate that the e-mail message is important or have particular relevance to the user, or that the e-mail message is not important or does not have particularly relevant for the user. Advantageously, the user does not need to do the indication every time when reading the mail. If the indication has not been received, the process returns to the idle step 400. If the user indicates the preference for the e-mail message, the preference information is received in step 418. The mobile station 100 receives the preference information from the user and forwards the reference information to the mail agent 208 via the multiple network platforms. Alternatively, other devices for the client application platforms may be used for conveying the preference information within the reach of the mail agent 208. The mail agent 208 receives the preference information. The mail agent 208 processes the preference information in step 420. A goal of the processing is to form the user preference profile, for example, what kind of e-mail message the user prefers for. The referred examples of the operations of the mail agent can be applied in the step 420, for example, the user profiles, the selection of the relevant word, the calculation of the message priority, the priority model. Alternatively, the processing in the mail agent can take place spontaneously, for example, not having the dependency on taking place after the reception of the preference information. For another example, the user's preference information is temporarily stored and processed afterwards.

Some embodiments of the invention apply calibration of the user preference model. The user is given a set of certain terms beforehand. The user indicates what terms he prefers for. The system of the mail agent 208 receives this indication depicting user's preference information. The user can apply the mobile station 100 and other input way such as the computer for giving the preference information. The system of the mail agent 208 processes the preference information and forms a user preference model. The user preference model can be applied when an e-mail message for the user is received. The mail agent 208 can perform the processing of the e-mail message for resulting in the list of user's preference e-mails in accordance with the beforehand applied user preference model. Moreover, further preference indication by the user can have an effect on the preference list. Thus, even if the calibration has been performed, the user can have a possibility to further give preferences, and these further preferences may influence the future preference list.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims. For example, the linear profile has been exemplarily described, and a non-linear profile can be applied also. However, because of the extreme simplicity of the linear version, its robustness can be assumed to beat more sophisticated methods.

The invention claimed is:

1. A method comprising:
   receiving an electronic mail message at a mobile station,
   indicating the electronic mail message by a level based on a preference of the electronic mail message for a user of the mobile station, wherein the preference is based on interest priority in content of the electronic mail message,
   collecting, by a mail agent, reference preference information used to indicate the preference,
   wherein the reference preference information is taken from the content of the electronic mail message, and
   presenting a list, at the mobile station, indicating an order of preference for a plurality of electronic mail messages for the user based, at least in part, on the preference indicator of each of the plurality of electronic mail messages,
   wherein the list is further based on applying a priority model, wherein the priority model contains one or more patterns for the user about the preference of the user for certain electronic mail messages based on the reference preference information.

2. A method according to claim 1, wherein the list is further based on applying at least one algorithm based on a statistical analysis of a linguistic content of the electronic mail message.

3. A method according to claim 1, wherein the list is further based on applying a user profile containing information about the preference of the user for certain electronic mail messages.

4. A method according to claim 2, wherein the linguistic content comprises terms.

5. A method according to claim 4, wherein the terms comprises predetermined character strings.

6. A method according to claim 1, wherein the list is further based on a selection of a relevant word.

7. A method according to claim 6, wherein the selection of the relevant word comprises dividing the electronic mail messages into two groups: interesting, and not having a particular relevancy.

8. A method according to claim 1, wherein the preference for electronic mail message comprises at least one of electronic mail message having a relevance for the user, and electronic mail message not having a particular relevance for the user.

9. A method according to claim 1, wherein the indication comprises entering an option depicting the preference by the mobile station for the electronic mail message.

10. A method according to claim 1, wherein at least a part of the electronic mail message is contained in a message viable in a mobile environment.

11. A method according to claim 10, wherein the message comprises at least one of a data packet for a transfer in a packet based mobile environment, a SMS for transfer in a GSM environment, USSD for transfer in a GSM environment, R-data for transfer in a TDMA environment.

12. A method according to claim 1, wherein the preference indicator for the electronic mail message is received directly from the user at another device and the list is further based on the user provided preference indicator.

13. A method comprising:
receiving an electronic mail message at a mail agent,
processing the electronic mail message, by the mail agent, for resulting in an order of preference for electronic mail messages for a user of a mobile station,
collecting, by a mail agent, reference preference information used to indicate the preference,
wherein the reference preference information is taken from the content of the electronic mail message, and
transferring a list, to the mobile device, indicating the order of preference for the electronic mail messages for the user to the mobile station, wherein the list is further based on applying a priority model, wherein the priority model contains one or more patterns for the user about the preference of the user for certain electronic mail messages based on the reference preference information.

14. A method according to claim 13, wherein the list is further based on applying at least one algorithm based on a statistical analysis of a linguistic content of the electronic mail message.

15. A system comprising:
a mobile station configured to:
receive an electronic mail message at the mobile station,
indicate the electronic mail message by a level based on a preference of the electronic mail message for a user of the mobile station, wherein the preference is based on interest priority in content of the electronic mail message; and
a mail agent configured to:
collect reference preference information used to indicate the preference,
wherein the reference preference information is taken from the content of the electronic mail message, and
wherein the mobile station is further configured to:
present a list indicating an order of preference for a plurality of electronic mail messages for the user based, at least in part, on the preference indicator of each of the plurality of electronic mail messages,
wherein the list is further based on applying a priority model, wherein the priority model contains one or more patterns for the user about the preference of the user for certain electronic mail messages based on the reference preference information.

16. A system according to claim 15, wherein the list is further based on applying at least one algorithm based on a statistical analysis of a linguistic content of the electronic mail message.

17. A system according to claim 15, wherein the list is further based on applying a user profile containing information about the preference of the user for certain electronic mail messages.

18. A system according to claim 16, wherein the linguistic content comprises terms.

19. A system according to claim 18, wherein the terms comprises predetermined character strings.

20. A system according to claim 15, wherein the list is further based on a selection of a relevant word.

21. A system according to claim 18, wherein the selection of the relevant word comprises dividing the electronic mail messages into two groups:
interesting, and not having a particular relevancy.

22. A system according to claim 15, wherein the preference for electronic mail message comprises at least one of electronic mail message having a relevance for the user, and electronic mail message not having a particular relevance for the user.

23. A system according to claim 15, wherein the indication comprises entering an option depicting the preference by the mobile station for the electronic mail message.

24. A system according to claim 15, wherein at least a part of the electronic mail message is contained in a message viable in a mobile environment.

25. A system according to claim 24, wherein the message comprises at least one of a data packet for a transfer in a packet based mobile environment, a SMS for transfer in a GSM environment, USSD for transfer in a GSM environment, R-data for transfer in a TDMA environment.

26. A system according to claim 15, wherein the preference indicator for the electronic mail message is received directly from the user at another device and the list is further based on the user provided preference indicator.

* * * * *

UNITED STATES PATENT AND TRADEMARK OFFICE
CERTIFICATE OF CORRECTION

PATENT NO. : 9,553,839 B2  
APPLICATION NO. : 14/853514  
DATED : January 24, 2017  
INVENTOR(S) : Juha Syri et al.

Page 1 of 1

It is certified that error appears in the above-identified patent and that said Letters Patent is hereby corrected as shown below:

On the Title Page

The Notice which reads:

"Subject to any disclaimer, the term of this patent is extended or adjusted under 35 U.S.C. 154(b) by 0 days." should read:

"Subject to any disclaimer, the term of this patent is extended or adjusted under 35 U.S.C. 154(b) by 0 days. This patent is subject to a terminal disclaimer."

Item (63) the Related U.S. Application Data which reads:

"Continuation of application No. 10/522,050, filed as application No. PCT/FI2002/000645 on Jul. 22, 2005, now Pat. No. 9,135,236." should read:

"Continuation of application No. 10/522,050, filed on Jul. 22, 2005, now Pat. No. 9,135,236, based on application No. PCT/FI2002/000645, filed on July 22, 2002."

Item (45) "Jan. 24, 2017" should read:

"*Jan. 24, 2017"

Signed and Sealed this  
Fourteenth Day of March, 2017

Michelle K. Lee  
*Director of the United States Patent and Trademark Office*